(12) United States Patent
Kim (10) Patent No.: US 9,764,631 B2
(45) Date of Patent: Sep. 19, 2017

(54) POWER TRANSMISSION SYSTEM OF HYBRID ELECTRIC VEHICLE

(71) Applicant: Hyundai Motor Company, Seoul (KR)

(72) Inventor: Wan Soo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/452,290

(22) Filed: Aug. 5, 2014

(65) Prior Publication Data

US 2015/0111694 A1    Apr. 23, 2015

(30) Foreign Application Priority Data

Oct. 18, 2013   (KR) .................. 10-2013-0124731

(51) Int. Cl.
| | |
|---|---|
| *F16H 3/72* | (2006.01) |
| *B60K 6/442* | (2007.10) |
| *B60K 6/36* | (2007.10) |
| *B60W 30/19* | (2012.01) |

(52) U.S. Cl.
CPC .............. *B60K 6/442* (2013.01); *B60K 6/36* (2013.01); *B60W 30/19* (2013.01); *Y02T 10/6234* (2013.01); *Y10S 903/902* (2013.01); *Y10T 477/26* (2015.01)

(58) Field of Classification Search
CPC ........................................................ B60K 6/36
See application file for complete search history.

(56) References Cited

U.S. PATENT DOCUMENTS

| | | | | |
|---|---|---|---|---|
| 5,558,588 A | * | 9/1996 | Schmidt ................. | B60K 6/365 180/65.25 |
| 6,527,659 B1 | * | 3/2003 | Klemen ................. | B60K 6/365 475/2 |
| 6,558,283 B1 | * | 5/2003 | Schnelle ............ | F16H 37/0826 180/65.235 |
| 8,430,190 B2 | * | 4/2013 | Honda ..................... | B60K 6/36 180/65.21 |
| 2009/0011887 A1 | * | 1/2009 | Komada .................. | B60K 6/36 475/5 |

(Continued)

FOREIGN PATENT DOCUMENTS

| | | |
|---|---|---|
| JP | 2012-001094 A | 1/2012 |
| JP | 2013-121788 A | 6/2013 |
| KR | 10-0951967 B1 | 4/2010 |

*Primary Examiner* — Ramya Burgess
*Assistant Examiner* — Lillian Nguyen
(74) *Attorney, Agent, or Firm* — Morgan, Lewis & Bockius LLP (57) ABSTRACT

A power transmission system of a hybrid electric vehicle which uses an engine and first and second motor/generators as power sources may include an input device having a first input shaft receiving either or both of torques of the engine and the first motor/generator and provided with a first driving gear disposed thereon, and a second input shaft disposed in parallel with the first input shaft, receiving a torque of the second motor/generator, and provided with a second driving gear disposed thereon, an output device including an output shaft provided with one driven gear engaged with the first driving gear, a second driven gear engaged with the second driving gear, and an output gear disposed thereon, and outputting torque transmitted from the input device, and a final reduction device outputting torque transmitted from the output device as driving torque.

18 Claims, 5 Drawing Sheets

(56) References Cited

U.S. PATENT DOCUMENTS

| | | | | |
|---|---|---|---|---|
| 2010/0029436 A1* | 2/2010 | Katsuta | ................... | B60K 6/36 |
| | | | | 477/5 |
| 2010/0261565 A1* | 10/2010 | Ai | ......................... | B60K 6/365 |
| | | | | 475/5 |
| 2012/0006153 A1* | 1/2012 | Imamura | ............... | B60K 6/442 |
| | | | | 74/665 A |
| 2012/0143422 A1* | 6/2012 | Kitahata | ............ | F16H 57/0484 |
| | | | | 701/22 |
| 2013/0288854 A1* | 10/2013 | Kobayashi | .............. | B60L 15/20 |
| | | | | 477/5 |
| 2013/0345019 A1* | 12/2013 | Kaltenbach | ........... | B60K 6/387 |
| | | | | 477/5 |
| 2014/0378258 A1* | 12/2014 | Kim | ...................... | B60K 6/365 |
| | | | | 475/5 |
| 2015/0040719 A1* | 2/2015 | Kim | ...................... | B60K 6/547 |
| | | | | 74/661 |

\* cited by examiner

| driving mode | SL1(CL1) | SL2(CL2 or SL) | Mode | Driving strategy |
|---|---|---|---|---|
| EV mode | ● | ○ (when the MG1 also operates) [not necessary in third exemplary embodiment] | when starting or beginning to run at low speed | · MG2 is operated<br>· MG1 is also operated if necessary (uphill road driving /sudden acceleration) |
| engine mode | ○ (used when MG2 is operated as auxiliary power source) | ● | high-speed driving | · MG2 is operated as auxiliary power source if necessary |
| HEV power performance mode | ● | | driving on city road (SOC of battery is sufficient) | engine is operated at maximum fuel economy point<br>· MG2 is operated<br>· MG1 charges battery |
| regenerative braking mode | ● | | deceleration/stop | · MG2 charges battery |

POWER TRANSMISSION SYSTEM OF HYBRID ELECTRIC VEHICLE

CROSS-REFERENCE TO RELATED APPLICATION

The present application claims priority to Korean Patent Application No. 10-2013-0124731 filed Oct. 18, 2013, the entire contents of which is incorporated herein for all purposes by this reference.

BACKGROUND OF THE INVENTION

Field of the Invention

The present invention relates to a power transmission system of a hybrid electric vehicle. More particularly, the present invention relates to a power transmission system of a hybrid electric vehicle which maximizes power delivery efficiency and achieves weight reduction and improves packageability by reducing the number of components.

Description of Related Art

Environmentally-friendly technique of vehicles is a very important technique on which survival of future motor industry is dependent. Vehicle makers are focusing on development of environmentally-friendly vehicles to meet environment and fuel consumption regulations.

Therefore, each vehicle maker is developing an electric vehicle (EV), a hybrid electric vehicle (HEV), a fuel cell electric vehicle (FCEV) and so on as future vehicles.

Since the future vehicles have various technical limitations such as weight and cost, the vehicle makers are paying attention to a hybrid electric vehicle in order to meet exhaust gas regulations and improve fuel economy and compete for commercializing the hybrid electric vehicle.

The hybrid electric vehicle is a vehicle using two or more power sources, and a gasoline engine or a diesel engine using fossil fuel and a motor/generator driven by electrical energy are used as the power sources of the hybrid electric vehicle.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of the multi-mode type has different features such a durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of maximizing power delivery efficiency by using an engine and two motor/generators and achieving weight reduction and improving packageability by reducing the number of components.

In various aspects of the present invention, a power transmission system of a hybrid electric vehicle may use an engine and first and second motor/generators as power sources.

In one aspect, the power transmission system may include an input device including a first input shaft receiving either or both of torques of the engine and the first motor/generator and provided with one driving gear disposed thereon, and a second input shaft disposed in parallel with the first input shaft, receiving a torque of the second motor/generator, and provided with another driving gear disposed thereon, an output device including an output shaft provided with one driven gear engaged with the one driving gear, another driven gear engaged with the another driving gear, and an output gear disposed thereon, and outputting torque transmitted from the input device, and a final reduction device outputting torque transmitted from the output device as driving torque.

In various exemplary embodiments, the engine may be selectively or operably connected to the first input shaft, the first motor/generator may be directly connected to the first input shaft, the one driving gear may be fixedly disposed on the first input shaft, the second motor/generator may be directly connected to the second input shaft, and the another driving gear may be rotatably disposed on the second input shaft.

In various exemplary embodiments, a torsional damper for absorbing and reducing torsional vibration may be disposed between the engine and first input shaft.

In various exemplary embodiments, a clutch for selectively transmitting torque may be interposed between the engine and the first input shaft.

In various exemplary embodiments, the engine may be selectively or operably connected to the first input shaft, the first motor/generator may be directly connected to the first input shaft, the one driving gear may be fixedly disposed on the first input shaft, the second motor/generator may be directly connected to the second input shaft, and the another driving gear may be fixedly disposed on the second input shaft.

The power transmission system may further include a selectively connecting device for selectively connecting the another driving gear with the second input shaft.

In various exemplary embodiments, the selectively connecting device may be a synchronizer or a clutch.

In various exemplary embodiments, the output shaft may be disposed in parallel with the first input shaft and the second input shaft, the one driven gear may be rotatably disposed on the output shaft, and the another driven gear and the output gear may be fixedly disposed on the output shaft.

The power transmission system may further include a selectively connecting device for selectively connecting the one driven gear to the output shaft.

The selectively connecting device may be a synchronizer or a clutch.

The final reduction device may include a differential apparatus and a final reduction gear engaged with the output gear, wherein the final reduction gear receives torque from the output shaft and transmits the torque to the differential apparatus.

In another aspect, the power transmission system may include an input device including a first input shaft receiving either or both of torques of the engine and the first motor/ generator and provided with a first driving gear disposed thereon, and a second input shaft disposed in parallel with the first input shaft, receiving a torque of the second motor/generator, and provided with a second driving gear disposed thereon, an output device including an output shaft disposed in parallel with the first input shaft and the second input shaft, first and second driven gears disposed on the output shaft and engaged respectively to the first and second driving gears, and an output gear fixedly disposed on the output shaft, a selectively connecting device disposed between the second input shaft and the second driving gear or between the output shaft and the first driven gear, and a final reduction device including a final reduction gear engaged with the output gear of the output device and a differential apparatus outputting torque transmitted from the final reduction gear as driving torque.

The engine may be selectively or operably connected to the first input shaft, the first motor/generator may be directly connected to the first input shaft, and the second motor/generator may be directly connected to the second input shaft.

In various exemplary embodiments, a torsional damper for absorbing and reducing torsional vibration may be disposed between the engine and first input shaft.

In various exemplary embodiments, a clutch for selectively transmitting torque may be interposed between the engine and the first input shaft.

In various exemplary embodiments, the selectively connecting device may include a first synchronizer selectively and operably connecting the second driving gear rotatably disposed on the second input shaft to the second input shaft, and a second synchronizer selectively and operably connecting the first driven gear rotatably disposed on the output shaft to the output shaft.

In various exemplary embodiments, the selectively connecting device may include a first clutch selectively and operably connecting the second driving gear rotatably disposed on the second input shaft to the second input shaft, and a second clutch selectively and operably connecting the first driven gear rotatably disposed on the output shaft to the output shaft.

In various exemplary embodiments, the second driving gear is fixedly disposed on the second input shaft, wherein the selectively connecting device may include a synchronizer selectively and operably connecting the first driven gear rotatably disposed on the output shaft to the output shaft.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that may have two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings include reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described with reference to the accompanying drawings so that those skilled in the Field of the Invention to which the present invention pertains may carry out the exemplary embodiment.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
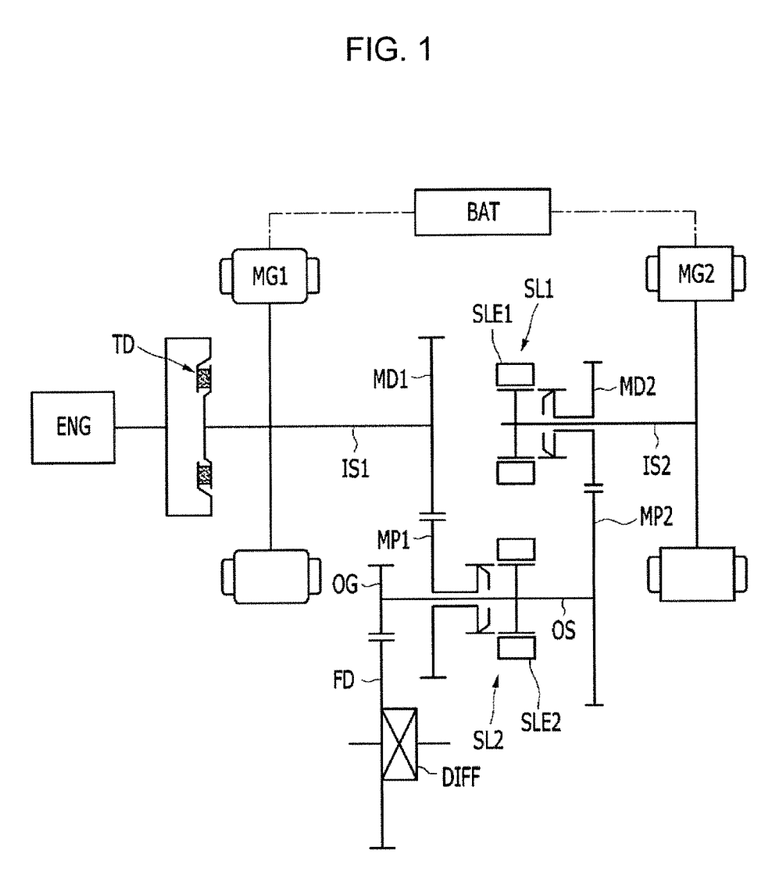
FIG. 1 is a schematic diagram of a power transmission system according to various exemplary embodiments of the present invention.

FIG. 1 is a schematic diagram of a power transmission system according to various exemplary embodiments of the present invention.

Referring to FIG. 1, a power transmission system of a hybrid electric vehicle according to the first exemplary embodiment of the present invention includes an engine ENG and first and second motor/generators MG1 and MG2 that are power sources, an input device, an output device, and a final reduction device.

The engine ENG is a power source and a gasoline engine or a diesel engine using fossil fuel may be used as the engine ENG.

The first and second motor/generators MG1 and MG2 are operated as a motor and a generator.

The input device includes a first input shaft IS1 receiving either or both of torques of the engine ENG and the first motor/generator MG1 and provided with a first driving gear MD1 disposed thereon, and a second input shaft IS2 disposed at the rear of the first input shaft IS1, receiving torque of the second motor/generator MG2, and provided with a second driving gear MD2 rotatably disposed thereon.

The first input shaft IS1 is connected to the engine ENG to receive torque of the engine ENG and is connected to the first motor/generator MG1 to receive torque of the first motor/generator MG1. The first driving gear MD1 is fixedly disposed on one end portion of the first input shaft IS1.

In addition, the second input shaft IS2 is directly connected to the second motor/generator MG2 to receive torque of the second motor/generator MG2, and the second driving gear MD2 is rotatably disposed on one end portion of the second input shaft IS2.

A torsional damper TD for absorbing and reducing torsional vibration is disposed between the first input shaft IS1 and an output side of the engine ENG, and the first input shaft IS1 is adapted to transmit the torque of the first motor/generator MG1 to the engine ENG to start the engine ENG.

The first motor/generator MG1 includes a first rotor and a first stator. The first rotor is connected to the first input shaft IS1 and the first stator is fixed to a transmission housing such that the first motor/generator MG1 is operated as a motor driving the first input shaft IS1 or as a generator generating electric energy by torque of the first input shaft IS1.

In addition, the second motor/generator MG2 includes a second rotor and a second stator. The second rotor is connected to the second input shaft IS2 and the second stator is fixed to the transmission housing such that the second motor/generator MG2 is operated as a motor driving the second input shaft IS2 or as a generator generating electric energy by torque of the second input shaft IS2.

In addition, the second driving gear MD2 is rotatably disposed on the second input shaft IS2. The second driving gear MD2 is selectively and operably connected to the second input shaft IS2 by a first synchronizer SL1 that is a selectively connecting device.

The output device includes an output shaft OS disposed in parallel with the first input shaft IS1 and the second input shaft IS2, first and second driven gears MP1 and MP2 disposed on the output shaft OS and engaged respectively with the first and second driving gears MD1 and MD2, and an output gear OG fixedly disposed on the output shaft OS.

The first driven gear MP1 is rotatably disposed on the output shaft OS and is selectively and operably connected to the output shaft OS by a second synchronizer SL2 that is a selectively connecting device. The second driven gear MP2 is fixedly disposed on the output shaft OS.

It is exemplified in the first exemplary embodiment of the present invention but is not limited that the first driven gear MP1 is rotatably disposed on the output shaft OS and the second driven gear MP2 is fixedly disposed on the output shaft OS. That is, the first driven gear MP1 may be fixedly disposed on the output shaft OS and the second driven gear MP2 may be rotatably disposed on the output shaft OS. In this case, the second driven gear MP2 is selectively and operably connected to the output shaft OS by the second synchronizer SL2.

The first synchronizer SL1 selectively and operably connects the second driving gear MD2 to the second input shaft IS2 and the second synchronizer SL2 selectively and operably connects the first driven gear MP1 to the output shaft OS.

Since the first and second synchronizers SL1 and SL2 are well known to a person of an ordinary skill in the art, detailed description thereof will be omitted. In addition, sleeves SLE1 and SLE2 used in the first and second synchronizers SL1 and SL2, well known to a person of an ordinary skill in the art, are operated by an additional actuator, and the actuator is controlled by a transmission control unit.

The final reduction device includes a differential apparatus DIFF and a final reduction gear FD. The final reduction gear FD is engaged with the output gear OG, decelerates torque transmitted from the output shaft OS, and transmits the decelerated torque to a driving wheel through the differential apparatus DIFF.

Figure 2:
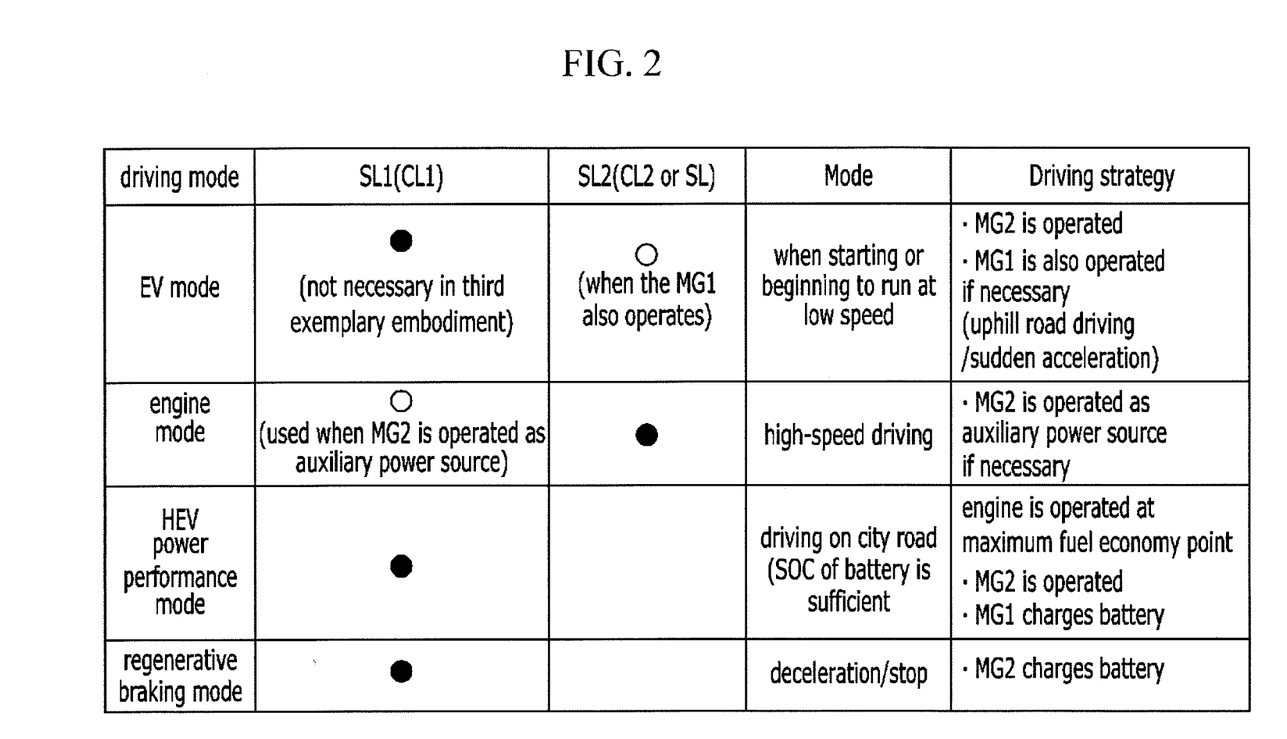
FIG. 2 is an operational chart of a selectively connecting device applicable to a power transmission system according to the various exemplary embodiments of the present invention at each mode.

FIG. 2 is an operational chart of a selectively connecting device applicable to a power transmission system according to various exemplary embodiments of the present invention at each mode. As shown in FIG. 2, the first synchronizer SL1 is operated at an electric vehicle (EV) mode, the second synchronizer SL2 is operated at an engine mode, the first synchronizer SL1 is operated at a hybrid electric vehicle (HEV) power performance mode, and the first synchronizer SL1 is operated at a regenerative braking mode.

[EV Mode]: As shown in FIG. 2, the first synchronizer SL1 is operated at the EV mode.

As shown in FIG. 1, the second input shaft IS2 and the second driving gear MD2 are operably connected, and the torque of the second motor/generator MG2 is transmitted sequentially to the second input shaft IS2, the second driving gear MD2, the second driven gear MP2, the output shaft OS, and the output gear OG. Therefore, the EV mode is achieved.

The EV mode is used when the vehicle starts or begins to run at a low speed (including a reverse speed).

In addition, when high power is necessary at the EV mode such as when the vehicle runs on an uphill road or the vehicle accelerates quickly, the second synchronizer SL2 is operated. In this case, the output shaft OS and the first driven gear MP1 are operably connected, and the torque of the first motor/generator MG1 is transmitted sequentially to the first input shaft IS1, the first driving gear MD1, the first driven gear MP1, the output shaft OS, and the output gear OG. Therefore, the first motor/generator MG1 supplies auxiliary power for running at the EV mode.

[Engine Mode]: The engine ENG is started by the first motor/generator MG1 and, as shown in FIG. 2, the second synchronizer SL2 is operated at the engine mode.

As shown in FIG. 1, the output shaft OS and the first driven gear MP1 are operably connected and torque of the engine ENG is transmitted sequentially to the first input shaft IS1, the first driving gear MD1, the first driven gear MP1, the output shaft OS, and the output gear OG. Therefore, the engine mode is achieved.

The engine mode is used when the vehicle runs at high speed, and the torques of the first and second motor/generators MG1 and MG2 are used as auxiliary powers. When the torque of the second motor/generator MG2 is used as auxiliary power, the first synchronizer SL1 is operated.

In addition, the first motor/generator MG1 is directly connected to the first input shaft IS1 and supplies auxiliary power, but can be operated as the generator without supplying the auxiliary power.

[HEV Power Performance Mode]: The HEV power performance mode is used when the vehicle runs on a city road in a state that an SOC of the battery BAT is sufficient. As shown in FIG. 2, the first synchronizer SL1 is operated at the HEV power performance mode.

As shown in FIG. 1, the second input shaft IS2 and the second driving gear MD2 are operably connected and the torque of the second motor/generator MG2 is transmitted sequentially to the second input shaft IS2, the second driving gear MD2, the second driven gear MP2, the output shaft OS, and the output gear OG. Therefore, the HEV mode is achieved.

At this state, the engine ENG operated at a maximum fuel economy point and the first motor/generator MG1 is operated as the generator by using the torque of the engine ENG. The electric energy generated by the first motor/generator MG1 is used to charge the battery BAT.

[Regenerative Braking Mode]: The regenerative braking mode is used when the vehicle decelerates or stops, and the first synchronizer SL1 is operated at the regenerative braking mode.

At this time, torque is transmitted from the driving wheel sequentially to the output gear OG, the output shaft OS, the second driven gear MP2, the second driving gear MD2, the second input shaft IS2, and the second motor/generator MG2 through the final reduction gear FD. Therefore, the second motor/generator MG2 is operated as the generator and charges the battery BAT.

The power transmission system of a hybrid electric vehicle according to the first exemplary embodiment of the present invention maximizes power delivery efficiency by using one engine and two motor/generators and achieves weight reduction and improves packageability by reducing the number of components.

In addition, the power transmission system can be mainly used as a power transmission system of a plug-in hybrid electric vehicle (PHEV) that runs mainly at the EV mode.

Figure 3:
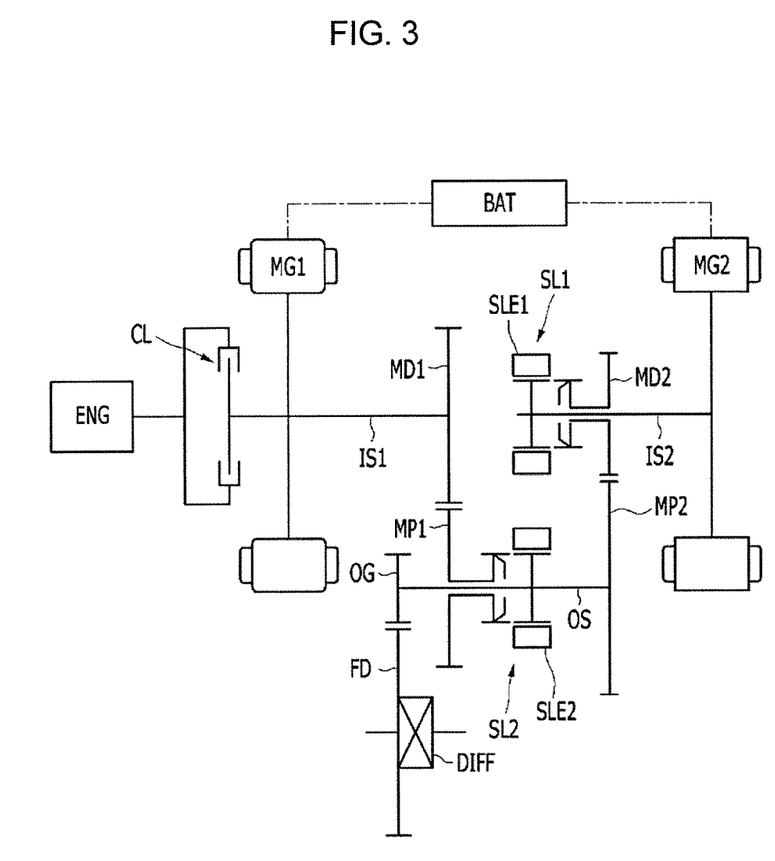
FIG. 3 is a schematic diagram of a power transmission system according to various exemplary embodiments of the present invention.

FIG. 3 is a schematic diagram of a power transmission system according to various exemplary embodiments of the present invention.

Referring to FIG. 3, a clutch CL, instead of the torsional damper TD, for selectively transmitting torque is interposed between the output side of the engine ENG and the first input shaft IS1 in the second exemplary embodiment. Therefore, the clutch CL is operated and the torque of the engine ENG is transmitted to the first input shaft IS1 only when the torque of the engine ENG is necessary.

That is, the clutch CL is operated when the engine ENG is started by using the first motor/generator MG1 or when the vehicle runs at the engine mode and the HEV power performance mode.

Since a layout and functions of the second exemplary embodiment are the same as those of the first exemplary embodiment except the clutch CL, detailed description thereof will be omitted.

Figure 4:
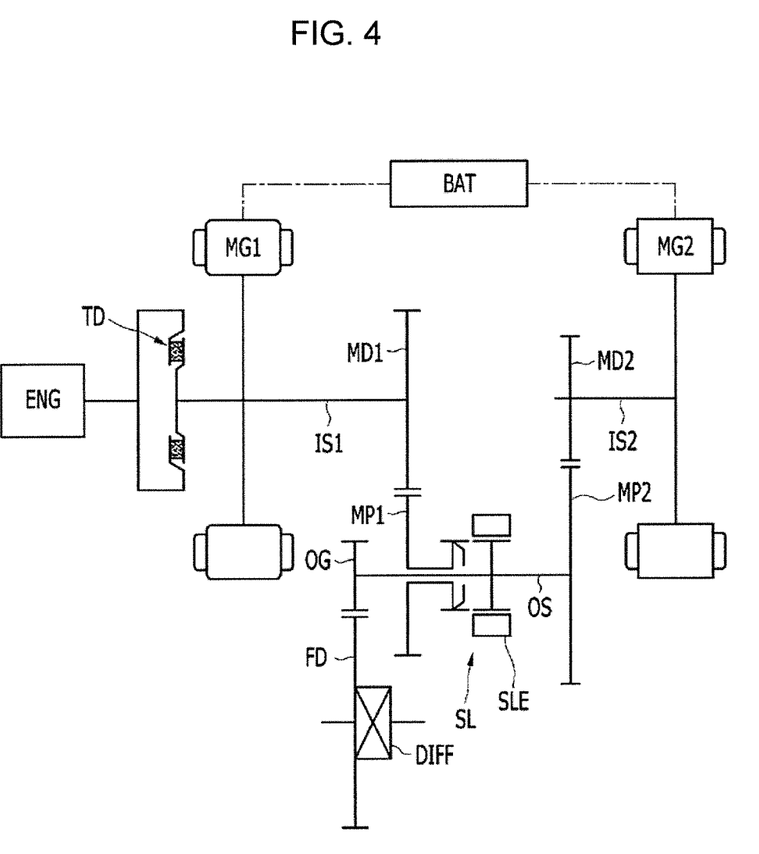
FIG. 4 is a schematic diagram of a power transmission system according to various exemplary embodiments of the present invention.

FIG. 4 is a schematic diagram of a power transmission system according to various exemplary embodiments of the present invention.

Referring to FIG. 4, a third exemplary embodiment uses one synchronizer SL instead of the first and second synchronizers SL1 and SL2 as the selectively connecting device, compared with the first exemplary embodiment.

That is, the second driving gear MD2 is fixedly disposed on the second input shaft IS2 and the first driven gear MP1 is rotatably disposed on the output shaft OS in the third exemplary embodiment. In this case, the first driven gear MP1 is selectively and operably connected to the output shaft OS by the synchronizer SL.

In addition, when the second motor/generator MG2 is operated, the torque of the second motor/generator MG2 is continuously transmitted to the output shaft OS.

Since a layout and functions of the third exemplary embodiment are the same as those of the first exemplary embodiment except removing the first synchronizer SL1, detailed description thereof will be omitted.

Figure 5:
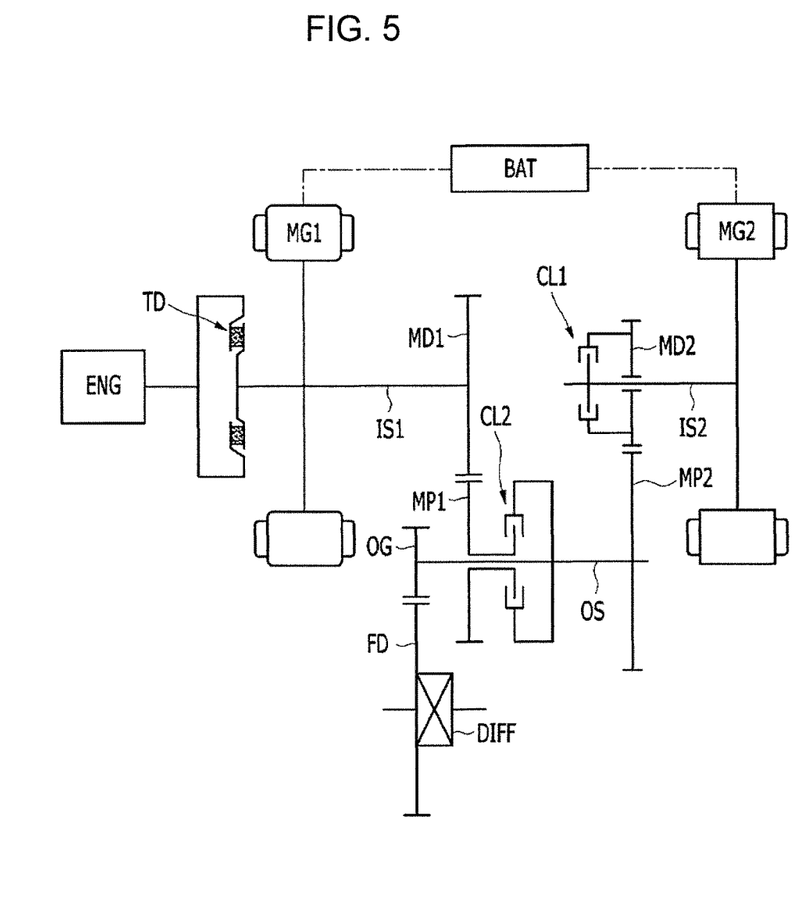
FIG. 5 is a schematic diagram of a power transmission system according to various exemplary embodiments of the present invention.

FIG. 5 is a schematic diagram of a power transmission system according to various exemplary embodiments of the present invention.

Referring to FIG. 5, the fourth exemplary embodiment uses first and second clutches CL1 and CL2 instead of the first and second synchronizers SL1 and SL2 as the selectively connecting device, compared with the first exemplary embodiment.

That is, the first clutch CL1 is disposed between the second input shaft IS2 and the second driving gear MD2, and the second clutch CL2 is disposed between the output shaft OS and the first driven gear MP1.

Herein, the first clutch CL1 and the second clutch CL2 may be a conventional multi-plate friction element of wet type that are operated by hydraulic pressure and may be controlled by a hydraulic control system.

Since a layout and functions of the fourth exemplary embodiment are the same as those of the first exemplary embodiment except using the first and second clutches CL1 and CL2 instead of the first and second synchronizers SL1 and SL1, detailed description thereof will be omitted.

The exemplary embodiments of the present invention may maximize power delivery efficiency by using one engine and two motor/generators and may achieve weight reduction and improve packageability by reducing the number of components.

In addition, the power transmission system can be mainly used as a power transmission system of a plug-in hybrid electric vehicle (PHEV) that runs mainly at the EV mode.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle which uses an engine and first and second motor/generators as power sources, comprising:

an input device including a first input shaft receiving either or both of torques of the engine and the first motor/generator without rotation speed change of both the engine and the first motor/generator and provided with one driving gear directly disposed thereon, and a second input shaft disposed in parallel with the first input shaft, receiving a torque of the second motor/generator without rotation speed change of the second motor/generator directly connected to the second input shaft, and provided with another driving gear disposed directly thereon;

an output device including an output shaft provided with one driven gear directly engaged with the one driving gear of the first input shaft, another driven gear directly engaged with the another driving gear of the second input shaft, and an output gear disposed thereon, and outputting torque transmitted from the input device; and a final reduction device outputting torque transmitted from the output device as driving torque.

2. The power transmission system of claim 1, wherein the engine is operably connected to the first input shaft, the first motor/generator is directly connected to the first input shaft, the one driving gear is fixedly disposed on the first input shaft, the second motor/generator is directly connected to the second input shaft, and the another driving gear is rotatably disposed on the second input shaft.

3. The power transmission system of claim 2, wherein a torsional damper for absorbing and reducing torsional vibration is disposed between the engine and the first input shaft.

4. The power transmission system of claim 2, wherein a clutch for selectively transmitting torque is interposed between the engine and the first input shaft.

5. The power transmission system of claim 2, further comprising:
a selectively connecting device for selectively connecting the another driving gear with the second input shaft.

6. The power transmission system of claim 5, wherein the selectively connecting device is a synchronizer or a clutch.

7. The power transmission system of claim 1, wherein the engine is selectively or operably connected to the first input shaft, the first motor/generator is directly connected to the first input shaft, the one driving gear is fixedly disposed on the first input shaft, the second motor/generator is directly connected to the second input shaft, and the another driving gear is fixedly disposed on the second input shaft.

8. The power transmission system of claim 1, wherein the output shaft is disposed in parallel with the first input shaft and the second input shaft, the one driven gear is rotatably disposed on the output shaft, and the another driven gear and the output gear are fixedly disposed on the output shaft.

9. The power transmission system of claim 8, further comprising a selectively connecting device for selectively connecting the one driven gear to the output shaft.

10. The power transmission system of claim 9, wherein the selectively connecting device is a synchronizer or a clutch.

11. The power transmission system of claim 1, wherein the final reduction device comprises a differential apparatus and a final reduction gear engaged with the output gear, and
wherein the final reduction gear receives torque from the output shaft and transmits the torque to the differential apparatus.

12. A power transmission system of a hybrid electric vehicle which uses an engine and first and second motor/generators as power sources, comprising:
an input device including:
a first input shaft receiving either or both of torques of the engine and the first motor/generator without rotation speed change of both the engine and the first motor/generator and provided with a first driving gear directly disposed thereon; and
a second input shaft disposed in parallel with the first input shaft, receiving a torque of the second motor/generator without rotation speed change of the second motor/generator directly connected to the second input shaft, and provided with a second driving gear directly disposed thereon;

an output device including an output shaft disposed in parallel with the first input shaft and the second input shaft, first and second driven gears disposed on the output shaft and directly engaged respectively to the first driving gear of the first input shaft and the second driving gear of the second input shaft, and an output gear fixedly disposed on the output shaft;

a selectively connecting device disposed between the second input shaft and the second driving gear or between the output shaft and the first driven gear; and a final reduction device including a final reduction gear engaged with the output gear of the output device and a differential apparatus outputting torque transmitted from the final reduction gear as driving torque.

13. The power transmission system of claim 12, wherein the engine is operably connected to the first input shaft, the first motor/generator is directly connected to the first input shaft, and the second motor/generator is directly connected to the second input shaft.

14. The power transmission system of claim 13, wherein a torsional damper for absorbing and reducing torsional vibration is disposed between the engine and first input shaft.

15. The power transmission system of claim 13, wherein a clutch for selectively transmitting torque is interposed between the engine and the first input shaft.

16. The power transmission system of claim 12, wherein the selectively connecting device comprises:
a first synchronizer selectively and operably connecting the second driving gear rotatably disposed on the second input shaft to the second input shaft; and
a second synchronizer selectively and operably connecting the first driven gear rotatably disposed on the output shaft to the output shaft.

17. The power transmission system of claim 12, wherein the selectively connecting device comprises:
a first clutch selectively and operably connecting the second driving gear rotatably disposed on the second input shaft to the second input shaft; and
a second clutch selectively and operably connecting the first driven gear rotatably disposed on the output shaft to the output shaft.

18. The power transmission system of claim 12, wherein the second driving gear is fixedly disposed on the second input shaft, and
wherein the selectively connecting device includes a synchronizer selectively and operably connecting the first driven gear rotatably disposed on the output shaft to the output shaft.

* * * * *